United States Patent [19]
Karasawa et al.

[11] Patent Number: 5,493,436
[45] Date of Patent: Feb. 20, 1996

[54] OPTICAL WAVE TRANSMISSION

[75] Inventors: Yoshio Karasawa, Saitama; Takashi Matsudo, Shiki; Hisato Iwai, Oomiya; Takayasu Shiokawa, Koganei, all of Japan

[73] Assignee: Kokusai Denshin Denwa Company, Limited, Tokyo, Japan

[21] Appl. No.: 408,325

[22] Filed: Mar. 21, 1995

Related U.S. Application Data

[63] Continuation of Ser. No. 910,472, Jul. 8, 1992, abandoned.

[30] Foreign Application Priority Data

Jul. 25, 1991 [JP] Japan ..................... 3-186228

[51] Int. Cl.⁶ .......................... H04B 10/22; H04B 10/10
[52] U.S. Cl. ..................... 359/145; 359/159; 359/118
[58] Field of Search .................... 359/144, 145, 359/159, 173, 118, 125, 137

[56] References Cited

U.S. PATENT DOCUMENTS

| | | | |
|---|---|---|---|
| 5,134,621 | 7/1992 | Marshall | 359/181 |
| 5,253,095 | 10/1993 | Menadier | 359/176 |

FOREIGN PATENT DOCUMENTS

| | | | |
|---|---|---|---|
| 0085150 | 5/1984 | Japan | 359/144 |
| 0217743 | 10/1985 | Japan | 359/144 |
| 0204695 | 9/1987 | Japan | 359/145 |
| 0278866 | 11/1987 | Japan | 359/145 |
| 0017527 | 1/1989 | Japan | 359/144 |
| 0162846 | 6/1990 | Japan | 359/145 |
| 8801085 | 2/1988 | WIPO | 359/144 |

*Primary Examiner*—Leslie Pascal
*Attorney, Agent, or Firm*—Jordan and Hamburg

[57] ABSTRACT

A system for communicating between mobile units and an exchange station, with a radio frequency signal, in which an electric signal from a telephone exchange of the telephone station is converted into an optical signal with an electricity-to-light converter. The optical signal is carried via an optical fiber cable to a transmission communication antenna for emission, with amplification of the optical signal if necessary. The emitted signal is received by a receiving communication antenna, amplified with an optical amplifier if necessary, and converted to an electric signal with a light-to-electricity converter.

3 Claims, 4 Drawing Sheets

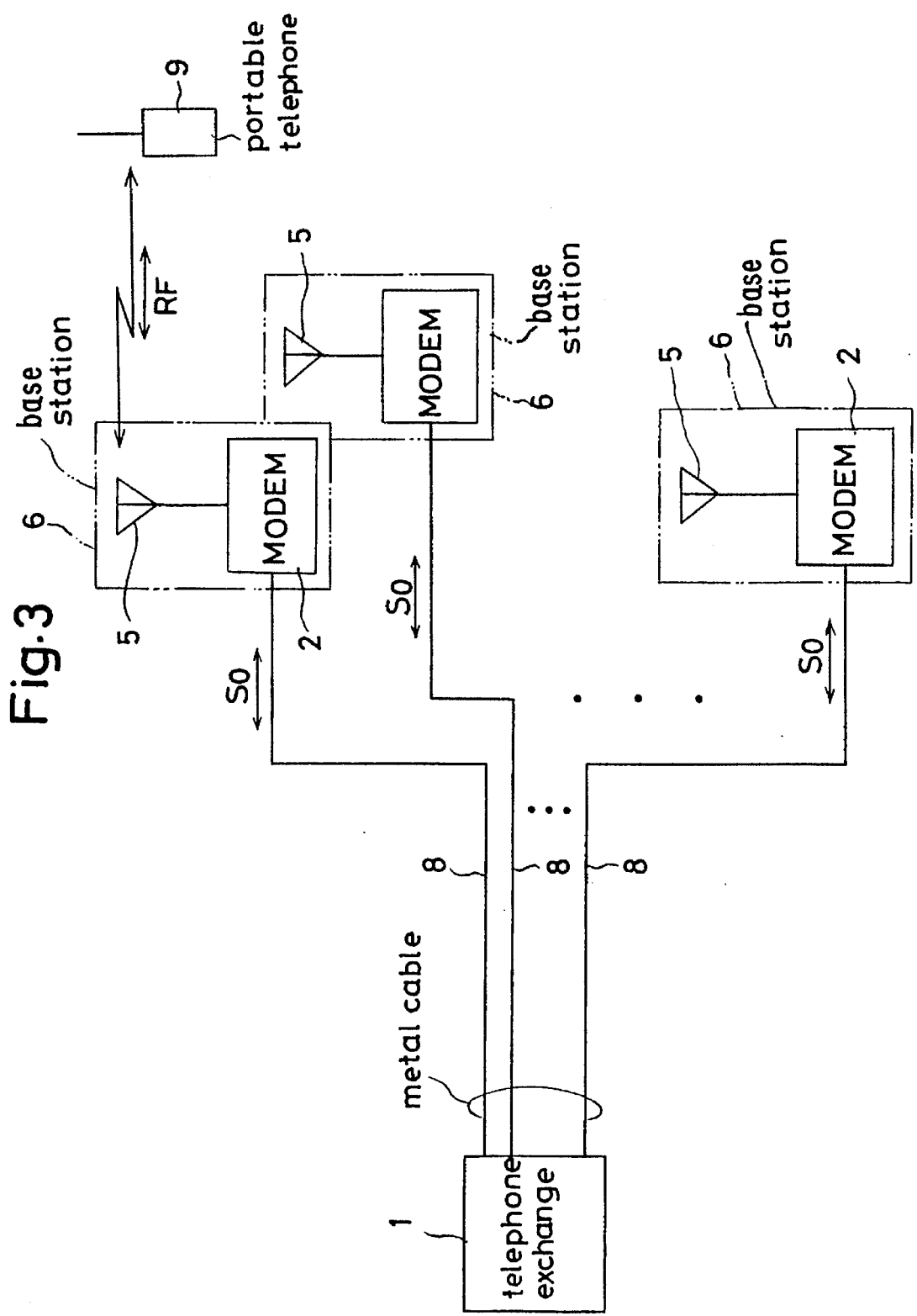

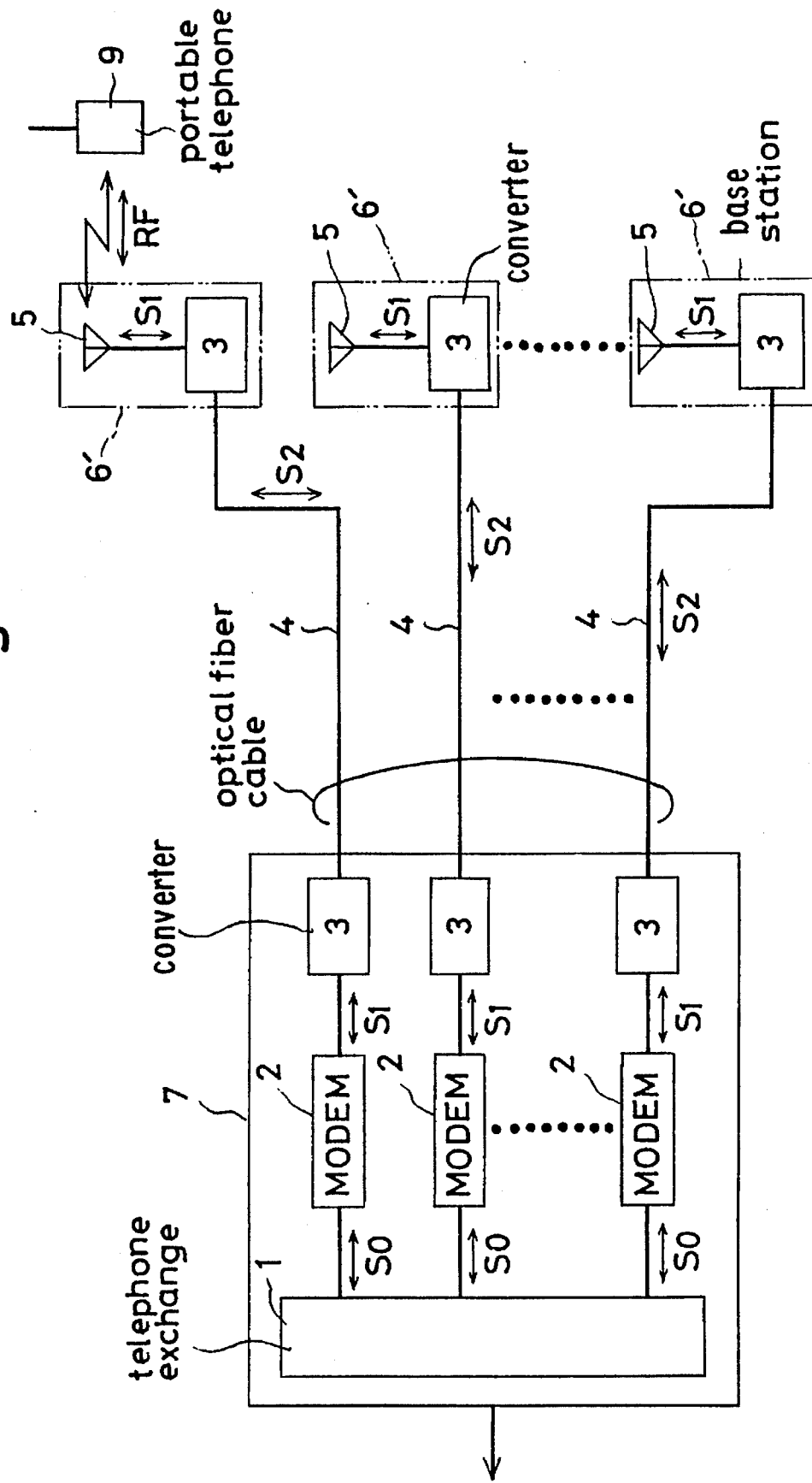

OPTICAL WAVE TRANSMISSION

This application is a continuation of application Ser. No. 07/910,472 now abandoned filed Jul. 8, 1992.

BACKGROUND OF THE INVENTION

The present invention relates to a system for performing communication between mobile units by radio frequency signal, and more particularly relates to improved constitution of optical feeder link transmitting radio-frequency-modulated optical signal for the disposition of a wireless base station in such a system.

FIG. 8 shows the constitution of a distant-site portable or private-branch telephone system which has been conceived as a development of a near-site portable telephone system. FIG. 4 shows the constitution of an improved distant-site portable or private-branch telephone system for reducing the cost of the providing of the wireless base stations of the system shown in FIG. 8. Shown in these drawings are a wire communication signal S0, an electric signal S1 for communication, a radio-frequency-modulated optical signal S2, a wireless signal RF for communication, a telephone exchange 1, a modem 2, an electricity-to-light and light-to-electricity converter 3, an optical fiber cable 4, a wireless communication antenna 5, wireless base stations 6 and 6', a private branch exchange station 7, a conventional metal cable 8, and a portable telephone 9. In the system shown in FIG. 3, the radius of each of service zones is made small enough to make it possible to use a limited number of frequencies for communication between all the pairs of the zones. However, this results in making the number and cost of the wireless base stations 6 of the system very large and high. To avoid such a problem, the system shown in FIG. 4 has been proposed and studied as mentioned by Shibuya et al. in Technical Report RCS90-12, 1990, published by Radio Communication System Research Group of Institute of Electronics, Information & Communication Engineers of Japan. In the system shown in FIG. 4, the modems 2 are disposed together in the private branch exchange station 7, the radio-frequency-modulated optical signal S2 is transmitted between the exchange station and each wireless base station 6' through the optical fiber cable 4 to send information between the stations, and the wireless base station is made of only the electricity-to-light and light-to-electricity converter 3 and the wireless communication antenna 5, so that the constitution of the system is simplified. For that reason, it is very probable that the system will be a practical one in the future.

It is common that information is transmitted not only through a cable but also through a wireless means, apart from whether a specific communication system such as a mobile-unit communication system and a fixed-unit communication system is used or not. A communication system in which such transmission is performed not through the use of electromagnetic waves but through the use of a light beam has already been put into practical use, as mentioned by Sakanaka et al. in Report B-481 on Autumnal National Convention of Institute of Electronics, Information & Communication Engineers of Japan, 1989.

Whether a communication system functions properly or not depends on how an appropriate wirelessly-communicable area, which is hereinafter referred to as service area, can be created. If the constitution of the system shown in FIG. 4 is adopted to form a private branch wireless telephone system in a building, there is no big problem. However, if the wireless base station 6' is provided in the building in the case that the service area of the telephone system covers a wide field such as an athletic ground and a working site, which is located next to the building, there is a limit upon the extension of the service area. To avoid this problem, the other wireless base station 6' needs to be provided in the field. For that purpose, the optical fiber cable 4 needs to be laid. However, this is not convenient in the case that the temporary or provisional laying of a communication line, which seems to become a main form of utilization of space in the field, is enough. When the service area of the telephone system provided in the building is desired to be extended to a building next to the former, the laying of the optical fiber cable 4 for the extension is sometimes inconvenient to make the extension impossible. It is conceivable that to avoid the inconvenience of the laying of the optical fiber cable, a signal is transmitted by electromagnetic waves from inside the extended service area to the wireless base station 6' in the wide field. However, because of electromagnetic wave interference, the frequency of the waves cannot be made equal to that of those for communication between the wireless base station 6' and the mobile telephone 9, and a new frequency needs to be allocated to the former waves. In other words, there are many restrictions due to the constitution of the telephone system and the statute of electromagnetic waves, to make it impossible to extend the service area in an easy and simple manner. If light is used instead of the electromagnetic waves to transmit the signal, the restrictions due to the statute are eliminated. However, if the above-mentioned communication system in which the light beam is used is adopted for the transmission, a function in which information in a signal transmitted through a cable is converted into an electric signal in a base band through modulation, the electric signal is then converted into an optical signal and the optical signal is then transmitted, and another function in which the optical signal is received and converted into an electric signal in a base band through demodulation, the electric signal is then transmitted through a cable are required. For that reason, the adoption of the communication system does not result in making the extension of the service area simpler, easier and less expensive.

SUMMARY OF THE INVENTION

The present invention was made in order to solve the above-described problems of the conventional communication system shown in FIG. 4.

Accordingly, it is an object of the present invention to provide a communication system which employs optical feeder link for communication between mobile units and is such that even though it is difficult to lay a cable between a building and another building, an outdoor site or the like, a wireless base station can be disposed in the latter building, the outdoor site or the like with a transmission line of simple constitution so as to easily extend the service area of the system.

An example of the communication system includes at least one wireless base station, and a mobile-unit communication exchange station which controls the former station. The example is characterized in that an electric signal from the telephone exchange of the exchange station is converted into an optical signal by an electricity-to-light converter; the optical signal fed through optical fiber is emitted from the optical communication antenna near the exchange station into the space after the optical signal is amplified by an optical amplifier if the level of the signal is not high enough;

the optical signal transmitted through the space is received by the optical communication antenna near the wireless base station; and the received optical signal is converted into an electric signal by a light-to-electricity converter after the received signal is amplified by an optical amplifier if the level of the signal is not high enough.

In another example of the communication system, an optical signal modulated by a radio-frequency signal is used for communication between at least one wireless base station and a mobile-unit communication exchange station which controls the former station. The example is characterized in that the optical signal generated through input is emitted from the optical communication antenna of one of the stations into the space after the optical signal is amplified by an optical amplifier if the level of the signal is not high enough; the optical signal transmitted through the space is received by the optical communication antenna of the other of the stations; and the received signal is handled for output after the signal is amplified by an optical amplifier if the level of the signal is not high enough.

In yet another example of the communication system, an optical signal is used for communication between two sites. The example is characterized in that the optical signal generated through input and having a prescribed wavelength is emitted from an optical communication antenna into the space at one of the sites after the signal is amplified by an optical amplifier if the level of the signal is not high enough; the signal transmitted through the space is received by an optical communication antenna at the other of the sites; and the received signal is handled for output after the signal is amplified by an optical amplifier if the level of the signal is not high enough.

In the communication system, an optical fiber cable is laid only at the short length between each pair of an electricity and light converter and an optical communication antenna. In other words, when the wireless base station is disposed temporarily or permanently, another optical fiber cable does not need to be permanently laid at either of the wireless base station and mobile-unit communication exchange station. Even if the distance between the wireless base station and the exchange station is changed, the base station can be disposed in an easy and simple manner.

Since a part of the transmission line between the wireless base station and the mobile-unit communication exchange station, which are connected to each other through the optical fiber cables, is constituted by an optical signal transmission in space in the communication system, the restrictions on the disposition of the base station for the communication between the mobile units are reduced to increase the degree of freedom of the disposition to make it possible to easily extend the service area of the system.

The cost of communication at field work through the system can thus be lowered. When an optical fiber cable between an exchange station and a wireless base station is cut off due to an accident or the like, a provisional detour transmission line can be constituted by the communication system for the cable until the completion of the repair of the cable so as to shorten the time of disruption of communication service.

DESCRIPTION OF THE DRAWINGS

FIG. 3 is a structural diagram of a conventional distant-site portable or private-branch telephone system; and FIG. 4 is a structural diagram of an improved conventional distant-site portable or private-branch telephone system for reducing the cost of the providing of the wireless base stations of the system shown in FIG. 3.

DETAILED DESCRIPTION OF EXEMPLARY EMBODIMENT

An embodiment of the present invention and a modification of the embodiment are hereafter described in detail with reference to the drawings attached hereto.

Figure 1:
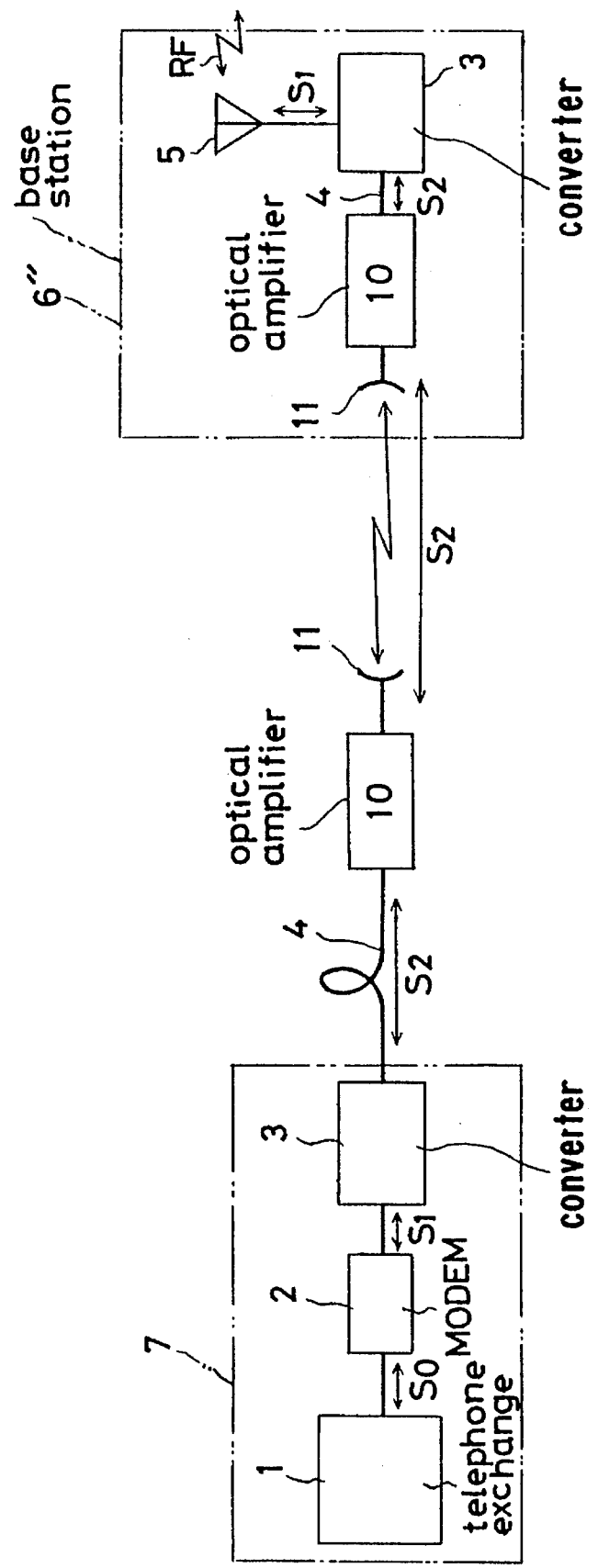
FIG. 1 is a structural diagram of a communication system which is an embodiment of the present invention.
Figure 2:
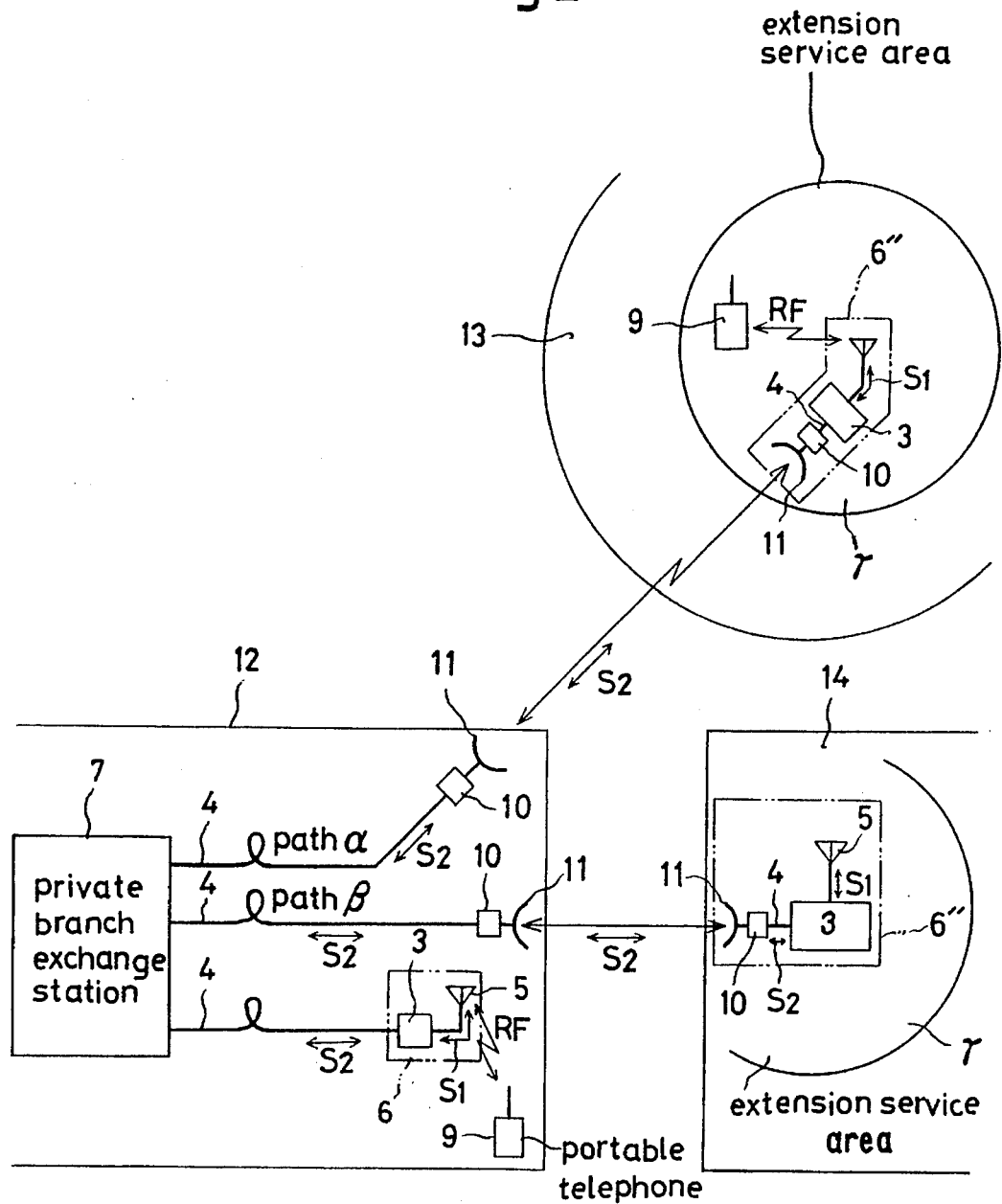
FIG. 2 is a structural diagram of an extended communication system which is a modification of the embodiment.

FIG. 1 shows the constitution of a communication system which is the embodiment. FIG. 2 shows the constitution of an extended communication system which is the modification and results from the extension of the service area of a private branch wireless communication system similar in constitution to that shown in FIG. 4. Shown in the drawings are a telephone exchange 1, a modem 2, electricity-to-light and light-to-electricity converters 3, optical fiber cables 4, wireless communication antennas 5, wireless base stations 6' and 6", a private branch exchange station 7, a portable telephone 9, optical amplifiers 10, optical communication antennas 11, a path $\alpha$ which is provided when one of the wireless base stations is temporarily disposed in a field such as an athletic ground and a working site, which is located relatively near the exchange station, a building 12 originally provided with the private branch wireless communication system, a path $\beta$ which is provided to connect the building to a nearby building 14 to enable communication between them through an identical system although the latter building is located outside the service area of the private branch wireless communication system, an extension $\gamma$ of the service area of the system, a field 13 to which the former path is connected, the latter building 14 to which the latter path is connected, electric signals S1, optical signals S2, and wireless communication signals RF. The communication system shown in FIG. 1 includes the private branch exchange station 7, the optical fiber cable 4, the optical amplifier 10, the optical communication antenna 11, and the wireless base station 6". The extended communication system shown in FIG. 2 includes the private branch exchange station 7, the wireless base station 6', the optical fiber cable 4 between them, the other wireless base station 6", the path $\alpha$ between the exchange station and the latter base station, the yet other wireless base station 6"', and the other path $\beta$ between the exchange station and the last base station. The communication systems shown in FIGS. 1 and 2 are the same as each other in basic constitution and operation.

In the conventional communication system shown in FIG. 4, a path is constituted by the optical fiber cable 4 extending from the private branch exchange station 7 to the electricity-to-light and light-to-electricity converter 8 of the wireless base station 6'. In the path g of the extended communication system shown in FIG. 2, the optical amplifier 10 amplifies the optical signal S2 to a level high enough to transmit the signal through the space. The amplified optical signal S2 is emitted from the optical communication antenna 11 into the space, and then received by the optical communication antenna 11 of the wireless base station 6". The received optical signal S2 is amplified by the optical amplifier 10 of the station 6", and then entered into the converter 8 thereof. The wireless communication signal RF is received from the mobile telephone 9 by the wireless communication antenna 5 of the base station 6", and then converted into the electric signal S1 which is converted into the other optical signal S2 which is transmitted to the exchange station 7 through the path α. If the level of each unamplified optical signal S2 is high enough, the optical amplifiers 10 do not need to be provided. The optical communication antennas 11 may be conventional ones such as a condensing lens.

The path β connects the exchange station 7 in the building 12 and the base station 6" in the other building 14 to each other to extend the service area of the private branch wireless communication system in the former building to enable the communication between the buildings through the extended communication system although the latter building is located outside the service area of the former system. The path β is the same in constitution and operation as the former path α.

The present invention is not confined to the above-described embodiment and modification, but may be embodied or practiced in other various ways without departing from the spirit or essential character of the invention. For example, the wireless base stations 6' and 6" and the private branch exchange station 7 may be provided not only in the buildings 12 and 14 and the field located relatively near exchange station, but also in other various provisional or permanent sites.

What we claim is:

1. A communication system comprising:
   at least one wireless base station including:
      a first optical communication antenna, and
   a communication exchange station which controls each wireless base station, said communication exchange station including:
      a telephone exchange for providing an electric signal,
      means for converting said electric signal from the telephone exchange into an optical signal,
      a second optical communication antenna, and
      means for directing said optical signal from said means for converting through a first optical fiber cable to said second optical communication antenna for transmission thereof into space, whereby said optical signal transmitted through space is received by said first optical communication antenna; and
   each said wireless base station further including:
      means for transferring said optical signal received by said first optical communication antenna to a second optical fiber cable,
      a light-to-electricity converter for converting said optical signal from said second optical fiber cable to a radio-frequency signal, and
      a wireless transmission antenna for transmitting said radio-frequency signal.

2. The communication system of claim 1 further comprising an optical amplifier for amplifying said optical signal before it is emitted from said second optical communication antenna.

3. The communication system of claim 1 further comprising an optical amplifier for amplifying optical signals received by said first optical communication antenna.

\* \* \* \* \*